April 28, 1964  W. R. FREDRICKSON ETAL  3,131,308
SELF CALIBRATING RADIOMETER WITH BOTH REFERENCE SOURCE AND
TEST SOURCE INTERRUPTED BY ONE CHOPPER AND REFERENCE
SOURCE INTERRUPTED BY A SECOND CHOPPER
Filed Sept. 6, 1962  4 Sheets-Sheet 1

INVENTORS
W. R. FREDRICKSON
ROY PAULSON
DON STIERWALT
BY
ATTORNEYS

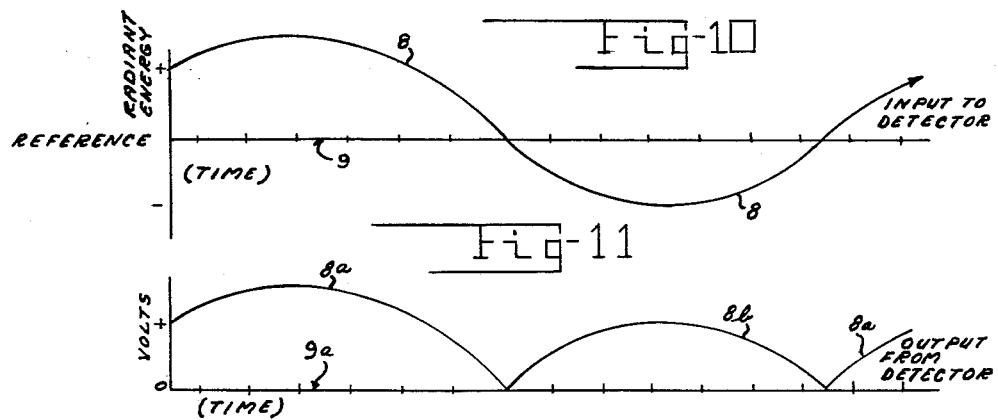
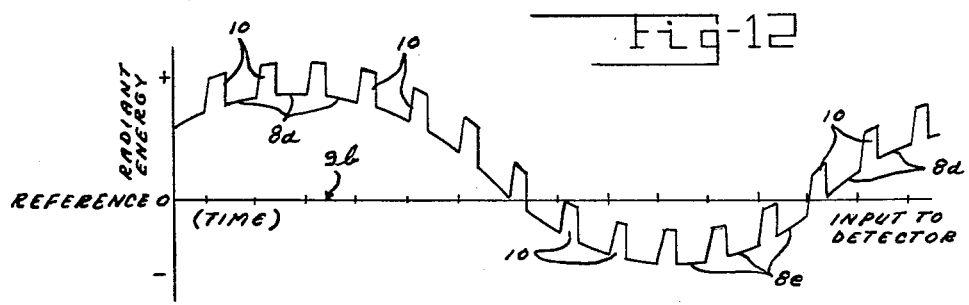
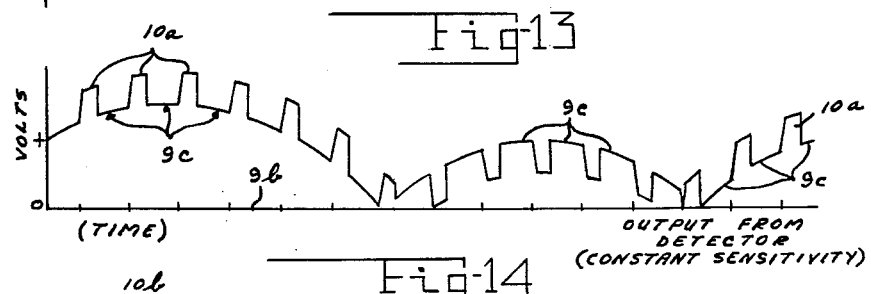
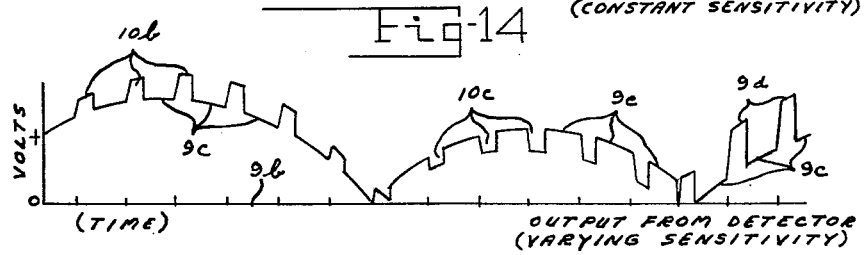

United States Patent Office 3,131,308
Patented Apr. 28, 1964

3,131,308
SELF CALIBRATING RADIOMETER WITH BOTH REFERENCE SOURCE AND TEST SOURCE INTERRUPTED BY ONE CHOPPER AND REFERENCE SOURCE INTERRUPTED BY A SECOND CHOPPER
William R. Fredrickson and Roy W. Paulson, Syracuse, N.Y., and Donald L. Stierwalt, Riverside, Calif., assignors to the United States of America as represented by the Secretary of the Air Force
Filed Sept. 6, 1962, Ser. No. 221,923
5 Claims. (Cl. 250—83.3)

This invention relates to automatic calibrating systems for radiometers and more particularly to improvements therein which enable calibration thereof without interruption of measurements made by the radiometers to provide phase information for nonsynchronous systems.

An object of the invention therefore is the provision of means for calibrating a radiometer without interrupting the measurements being taken by the instrument.

A further object is the provision of a radiometer including means for calibrating the radiometer relative to a reference temperature without interrupting the radiation temperature measurements from a target taken by the instrument, and determining whether radiation temperature from the target is warmer or colder than the radiometer reference temperature, for nonsynchronous systems.

A further object is the provision of a radiometer having a predetermined reference temperature for indicating an unknown target radiation and its relation to a predetermined radiometer reference value level and simultaneously indicating a known calibration radiation reference, which includes a first rotary chopper means for successive rapid interruption of the radiation from an unknown target to the radiometer input and from a reference radiation calibrating source to the radiometer input at a uniform rapid rate, and a second rotary chopper means between the calibration radiation reference source and the radiometer for intermittently interrupting the radiation from the reference radiation source to the input of the radiometer at a materially slower uniform rate than the rate of interruption of radiation from the unknown target.

A further object is the provision of a nonsynchronous radiometer having an input for receiving radiation from an unknown radiation source and simultaneously receiving radiation from a known value radiation reference source, including means for uniformly and successively interrupting radiation from an unknown radiation source to the radiometer and from the known value radiation source at a uniform rapid rate, and means between said radiometer and the known value reference radiation source for uniformly and successively interrupting the radiation from the known reference value radiation source to the radiometer at a different slower rate than the rate of interruption of radiation from the unknown radiation source.

A further object is the provision of calibrating means for radiometers of nonsynchronous systems including a radiation detector having optical means for collecting radiation from an unknown heat radiation source, having a first rotary chopper for successively and uniformly interrupting the radiation from an unknown source to the detector to thereby admit radiation pulses to the detector at a uniform rate, and a second predetermined radiation source for directing calibrating reference radiation into the detector through the first chopper to be successively interrupted thereby during rotation of the first chopper, and a second rotary chopper in the path of radiation from the calibrating reference radiation source to the detector rotatable at a slower uniform rate for successively interrupting radiation from the reference source at predetermined intervals independently of the interruption of radiation from the unknown radiation source by the first chopper during rotation thereof to thereby admit successive single radiation pulses from said reference radiation source to said detector at predetermined uniform intervals during reception of a plurality of pulses from said unknown radiation source, whereby the energy level of radiation from the unknown radiation source is simultaneously compared with radiation energy level output of the detector from the calibrating reference radiation source during simultaneous rotation of the first and second choppers.

A further object is the provision of a radiation detector having a nonsynchronous energy output for simultaneously comparing the energy level value of radiation from an unknown radiation source with a predetermined radiation energy level value for indicating variations in the stability of the detector during reception of radiation from the unknown radiation source, including means for determining if its energy level is greater or less than the radiation reference energy level output of said detector.

Other objects and advantages of the invention will become apparent from the following description and accompanying drawing in which like reference characters refer to like parts in the several figures of the drawing.

FIG. 1 diagrammatically illustrates one embodiment of the invention employing "fast" and "slow" rotary choppers located between the collecting optics and the radiometer or detector in a nonsynchronous system;

FIGURES 10 and 11 are diagrammatic views illustrating respectively the radiation level input and energy level output of a radiation detector of a conventional nonsynchronous type, in which the radiation input to the detector is varying between energy levels above and below the predetermined energy reference level of the detector.

FIGURE 12 is a diagrammatic view which illustrates the radiation input of a nonsynchronous radiation detector having a predetermined reference energy level, incorporating the invention, in which the detector radiation input is varying between energy levels above and below a predetermined radiation reference level.

FIGURE 13 is a similar diagrammatic view illustrating the detector energy level output of a radiation detector employing the invention when the detector is functioning at constant sensitivity with the detector input varying between radiation levels above and below the predetermined detector reference level value.

FIGURE 14 is a view similar to FIGURE 13, illustrating a nonsynchronous radiation detector system employing the invention in which the detector output is varying in sensitivity with the radiation level from the unknown radiation source also varying (as seen in FIG. 12) between points above and below the predetermined reference energy value of the detector.

Figure 1:
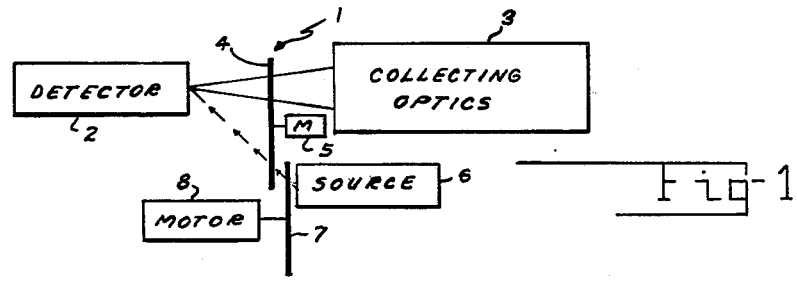

Referring to FIG. 1, the reference numeral 1 denotes a radiometer and calibrating means for a nonsynchronous system and includes a conventional radiation detector 2 with collecting optics 3 disposed in forwardly spaced relation to the detector 2 for collecting radiation, for instance, infrared radiation, from an unknown radiation source or target (not shown).

Interposed between the collecting optics 3 and the detector cell 2 is a rapidly rotatable "fast" radiation chopper 4 driven by a suitable motor 5 to successively interrupt and pass the radiant energy from the collecting optics 3 into the detector 2, and from a reference or calibrating radiation source 6, for instance an electric lamp, the reference calibrating radiation source being located in front of the detector 2, but at one side thereof for projecting radiation of a known or predetermined uniform radiation energy value into the detector 2.

A "slow" rotary chopper 7 is interposed between the reference radiation source 6 and the detector input 2 for uniformly interrupting and passing radiation from the radiation reference source 6 to the detector 2, successively at a uniform intermittent rate which is materially slower than the rate of interruption and passing of radiant energy pulses from the unknown radiation source to the detector 2, the "slow" chopper 7 being rotated at a uniform rate by a suitable power source, such as an electric motor, or a "clockwork" 8.

Figure 4:
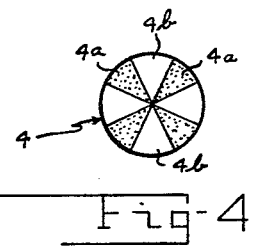
FIG. 4 is a schematic detail plan view of the "fast" or rapidly rotatable chopper disk.
Figure 5:
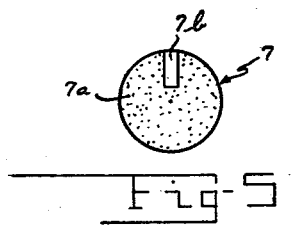
FIG. 5 is a similar detail view of the "slow" or slowly rotatable chopper disk.

The "fast" and "slow" rotary choppers 4 and 7 preferably overlap each other so that both of the choppers interrupt the radiation from the known or calibrating radiation source 6, the "fast" chopper 4, as seen in FIG. 4, preferably being in the form of a circular disk having a plurality of alternate opaque and transparent segments 4$^a$ and 4$^b$, while the "slow" chopper 7, as seen in FIG. 5, preferably, is in the form of a circular disk having a large opaque area 7$^a$ and a single narrow transparent slot or segment 7$^b$.

It will be observed that simultaneous rotation of the two choppers 4 and 7 cut the radiation or radiant energy entering the detector 2 from the calibrating reference source 6, while the "fast" chopper 4 also cuts or successively interrupts and passes radiation from only the unknown source to the detector 2. Since the fast chopper 4 interrupts the radiation or radiant energy from the radiation collecting optics 3 to the detector input a great number of times while the larger opaque area 7$^a$ of the slow chopper 7 is interrupting radiation from the known or calibrating reference radiation source 6 until the transparent portion or segment 7$^b$ thereof permits radiation from the calibration or reference source 6 to be received by the detector 2 simultaneously with radiation from the unknown radiation source, it will be seen that a plurality or larger group of radiation input pulses from the unknown radiation source are received by the detector 2, followed by a radiation input pulse or comparatively small group of input pulses from the known calibration source 6 simultaneously with the input pulses from the unknown radiation source or target.

As explained later, means are provided for nonsynchronous radiation detector systems for determining if the radiation level from the target or unknown source is warmer or cooler than the radiometer reference or calibration temperature as indicated in FIGURES 10 to 14, as well as determining if the sensitivity of the radiometer is constant or varying relative to the calibration or reference radiation level 9, and also to indicate the amount of the variation of the sensitivity of the detector 2 relative to the reference source 6.

Reference being made to FIGURES 10 to 14, the curve 8 denotes the input radiation energy level to a radiation detector of a nonsynchronous system where the radiation level is varying between points above and below a predetermined reference level indicated by the reference line 9, while the curve 8$^a$, 8$^b$ in FIGURE 11 indicates the energy output line of the detector, according to the value of radiation input from an unknown radiation source or target, as depicted in FIGURE 11 and the line 9$^a$ denotes the reference energy level, for instance, zero output. It will be noted that the curves 8$^a$ and 8$^b$ denote only the energy values of the output, but do not denote if the output value is above or below the reference input level (indicated by line 9 in FIG. 10) and this denotes a conventional output of a radiation detector of a nonsynchronous system. FIGURE 12 denotes the input of a radiation detector of a nonsynchronous system incorporating the invention, in which curve 8$^a$ denotes the energy input value when above the predetermined energy value reference indicated by the line 9$^b$, while the portion of the curve 8$^e$ denotes the radiation input energy level to the detector which is below the predetermined radiation reference level value (indicated by the line 9$^b$) and the energy value of the pulses of calibrating radiation which are fed into the detector at spaced intervals through the clear or open sector 7$^b$ of the slow chopper 7 are indicated at 10. It is to be noted that the condition depicted in FIGURES 12, 13 and 14 is present when the input from the unknown source is varying between plus and minus positions above and below the predetermined reference energy level represented by the line 9$^b$. In FIGURE 13, and under the same radiation input conditions just mentioned, the curve 9$^c$ denotes the energy output value of the detector, which is above the predetermined energy level, while the curve 9$^e$ denotes the portion of the input which is below reference level 9$^b$, and the calibration pulses through the slow chopper 7 are indicated at 10$^a$ for those above, and 10$^b$ for those below the predetermined reference level 9$^b$ of FIGURE 12.

In FIGURE 13 is illustrated a condition where the sensitivity of the detector is steady or constant relative to the reference, this being determined by the indication that the length of the calibration pulses 10$^a$ are all identical.

Where the sensitivity of the detector is varying during the reception of radiation from the unknown source or target, under the aforesaid conditions, it will be noted that a variation in the length of the calibration pulses, indicated at 10$^b$ and 10$^c$ takes place, as indicated in FIG. 14, relative to the input energy received by the detector, represented by the curve 9$^c$—9$^e$.

It will be observed that the output value of any radiation received by the detector which is above the reference energy level of the detector is a plus value, while the radiation below the reference has a minus value. Therefore, the output indication of the detector incorporating the invention indicates the phase, as well as the energy level value, of the unknown radiation received, as well as variations in the unknown radiation, and the relative variations in stability of the detector, simultaneously with the energy level of the radiation received from an unknown radiation source.

Figure 2:
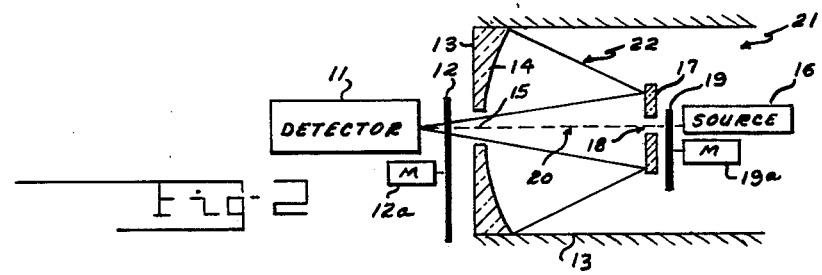
FIG. 2 illustrates diagrammatically a further embodiment, showing the reference radiation source and slow chopper located within the collecting optics for successively interrupting radiation from the reference radiation source.

In FIG. 2 the radiation receiver or detector is indicated at 11, having a "fast" chopper disk 12 located in front thereof, and rotatable at a rapid rate by a motor 12ª. Located within the casing 13 is a suitable concave mirror reflector 14 formed with a central opening 15 for passage therethrough of radiation from the calibration source 16 without striking the concave mirror 14. A flat full mirror 17 is disposed in spaced parallel relation to the concave mirror 14 and in front of the known radiation source 16, and is formed with a central aperture 18 to permit the calibrating reference radiation to pass therethrough to the detector 11.

A "fast" chopper disk 12, similar to that shown in FIG. 4, rapidly and successively interrupts and passes all radiant energy passing through the opening 15 into the detector 11.

A "slow chopper" disk 19, similar to the chopper disk 7, driven uniformly by a suitable power source or motor 19ª is located so as to successively cut or interrupt and pass the radiation beam 20 from the comparison or reference radiation energy source 16 during a comparatively long time interval during which the fast chopper disk 12 is successively interrupting and passing the radiation beam 22 through the opening 15 into the detector 11, followed by a comparatively short time interval during which the transparent or open sector in the "slow" chopper 19 permits the comparison beam 20 to pass into the detector 11 along with the beam 22 from the unknown radiation source, which beam 20 is also successively interrupted in rapid succession by the fast chopper 12.

Radiation from the unknown radiation source or target, which is to be measured or indicated by the detector 11, enters the front end 21 of the casing 13 and is reflected as indicated at 22 by the concave mirror 14 and flat mirror 17, and concentrated or focused through the opening 15 into the radiation intake end of the nonsynchronous detector 11 along with the calibrating radiation beam 20 from the reference source 16.

Figure 3:
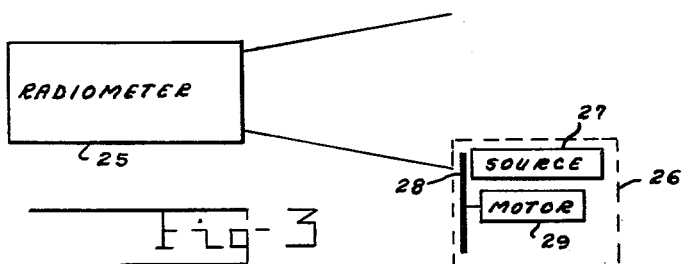
FIG. 3 illustrates a further embodiment of the invention in which the calibrating reference means is disposed in front of the radiometer and omits the fast chopper.

In the form of the invention shown in FIG. 3 the nonsynchronous radiation detector is indicated at 25 and disposed to receive radiation from a distant unknown source or target (not shown). A "slow chopper" 28 is disposed in a casing 26 having a predetermined adjustable reference or calibration source 27 for directing radiation of a known or predetermined value through the chopper 28 into the input end of a radiometer 25. The "slow" chopper 28, driven by a motor or clockwork 29, cuts or interrupts and passes the radiation from the source 27 into the radiometer 25 during regular prolonged time intervals during which the radiation from the unknown or target source also enters the input of the radiometer 25, followed by a comparatively short interval when the open or transparent segment of the "slow" chopper 28 permits the comparison radiation beam from the source 27 to enter the radiometer together with the radiation from the unknown source, to be indicated simultaneously thereby.

Figure 6:
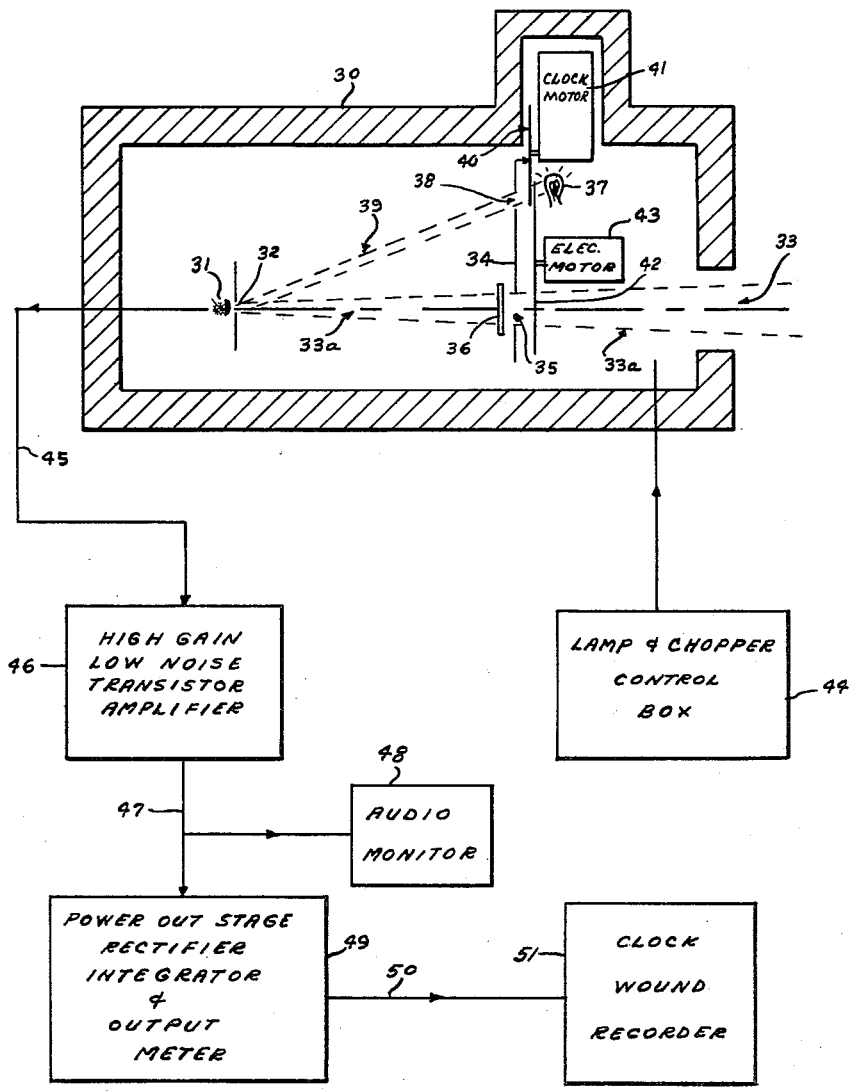
FIG. 6 is a diagrammatic view of a portable nonsynchronous radiometer system including the reference radiation source and the fast and slow choppers inclosed within an insulated box or receptacle and diagrammatically disclosing the control features thereof.
Figure 7:
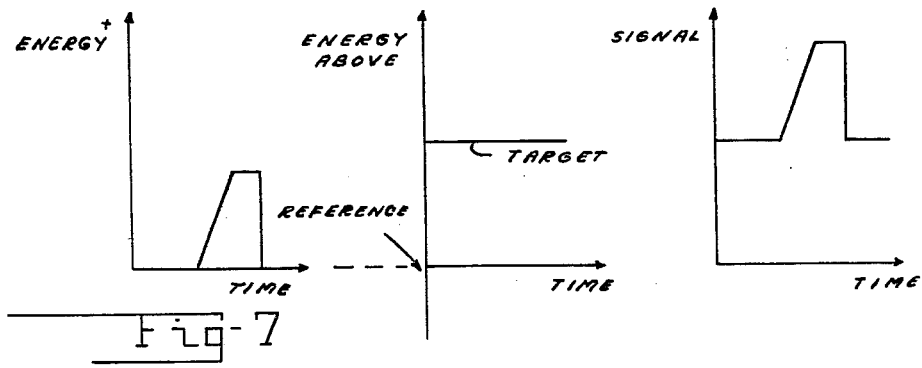
FIG. 7 is a schematic comparison diagram showing the shape and direction of the output pulses from a nonsynchronous radiometer relative to the reference energy level output of a radiation detector from the unknown radiation energy source, when the radiometer or detector energy level output is above a predetermined reference energy level.
Figure 8:
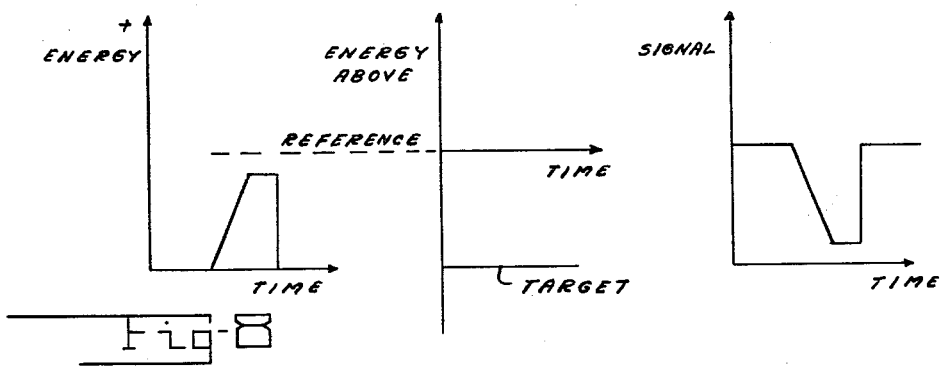
FIG. 8 is a similar view showing the shape and direction of the calibration pulse from the nonsynchronous radiometer relative to the predetermined energy level, when the radiometer output energy level is below the predetermined energy reference level.
Figure 9:
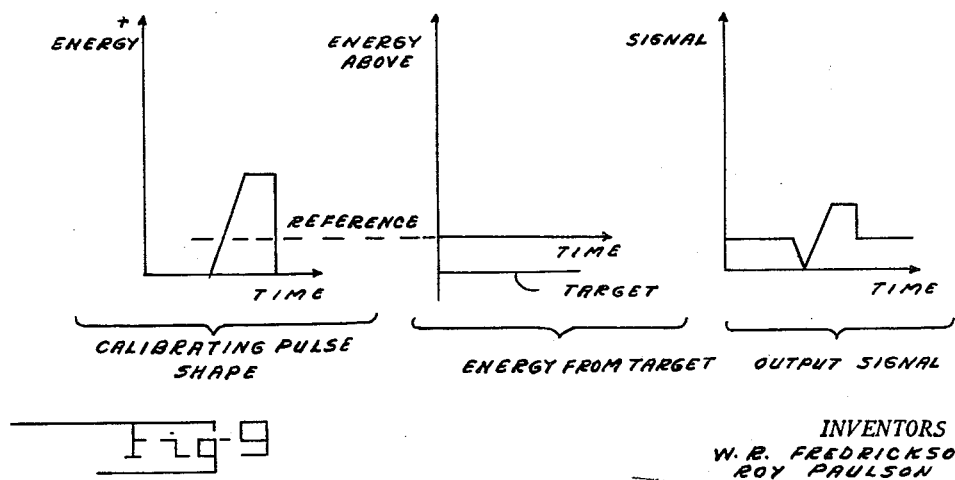
FIG. 9 is a similar view showing the shape and direction of the radiometer output pulse when the calibration pulse from the radiation reference source is partly above and partly below the predetermined reference energy level.

FIG. 6 illustrates a further exemplification of the invention, disclosing certain control features diagrammatically, in which the reference number 30 denotes an insulated box or casing such as a "black box" having a radiation responsive cell 31 therein, such as a photocell, which may be placed behind a "stop" aperture plate or diaphragm 32.

The casing 30 has an opening 33 in its front end for reception of radiation, such as infrared rays 33ª from a distant unknown source or target, which radiation passes through a "field of view" mask 34, through an opening 35 therein, behind which is a suitable filter 36.

A known or calibration reference source 37, such as an electric lamp, is disposed within the box 30, in front of the mask 34, its reference level intensity being determined by any conventional means, such as a rheostat (not shown) preferably adjustable exteriorly of the box 30, the mask 34 having a second opening 38 therein for directing a calibration beam of radiation 39 from the lamp 37 through the openings 38 and 32 onto the photocell 31.

A "slow" chopper 40, similar to the chopper 7 of FIG. 5, is disposed within the box 30, and driven by a suitable clockwork or motor drive 41, to cut or interrupt the calibration beam 39 during prolonged successive time intervals, as before explained.

A "fast" rotary chopper 42 is also disposed behind the mask 34, and is similar to the chopper 4, as seen in FIG. 4, this chopper cutting both the beam 39 from the calibrating lamp source 37 and the unknown radiation beam 33ª from a target (not shown). The fast chopper 42 is preferably driven by an electric motor 43. The speed of the motor 43 (and chopper 42) and the intensity of the calibration lamp 37 are independently controlled exteriorly of the box 30 by any suitable control means, illustrated diagrammatically at 44.

The energy output from the photocell 31 is connected by suitable circuit means 45 to a conventional high gain low noise, transistor amplifier 46, the output of which is connected by suitable circuits 47 to an audio monitor 48 and a power out stage, rectifier, integrator, and output meter diagrammatically illustrated at 49, the output of which, through suitable circuit connections 50, operates a conventional recorder, such as a clock-wound recorder 51.

It is to be understood that the invention contemplates means for obtaining phase information for nonsynchronous systems for determining the stability of the infrared radiometer or detector as well as determining whether the "target" is "warmer" or "colder" than the radiometer reference level temperature.

If the insertion of a "slow" chopper is inconvenient, the calibrating source could be moved into and out of the field of view of the detector whenever calibration (or a group of calibration pulses) is desired, or it could be left in the field of view and turned on and off to determine the calibration.

Because of the known shape of the calibration pulses, the signal from it can be determined, even though the target radiation or system sensitivity may be changing during the time of calibration.

Since many changes could be made in the apparatus described, all within the scope and spirit of the invention, the foregoing is to be construed as illustrative, and not in a limiting sense.

What we claim is:

1. A self-calibrating radiometer for nonsynchronous systems comprising, a radiation detector for receiving and indicating the variation of the energy level relative to a predetermined reference level relative to radiation received from a distant radiation source, a calibrating radiation source having a predetermined radiation level for directing calibrating radiation therefrom into said radiation detector, a "fast" chopper disposed in front of said detector for successively interrupting and passing radiation from the distant radiation source and from the calibrating radiation source at a uniform rapid rate, and a separate slow chopper disposed to interrupt radiation only from the calibrating radiation source, successively at a materially slower uniform rate than the rate of interruption of radiation from the distant radiation source, by said fast chopper.

2. Apparatus as claimed in claim 1 in which the fast chopper comprises a rotary disk having a plurality of opaque and transparent sectors and means for rotating the chopper at predetermined rapid rate of rotation to successively intermittently block and pass radiation from the distant radiation source and fro mthe calibrating radiation source at a predetermined rate, and said slow chopper comprises a rotary disk having a wide opaque area and a comparatively narrow transparent segment, disposed for interrupting radiation from said calibrating radiation source during a major portion of rotation of said slow chopper, and means for rotating said slow chopper at a materially slower rate of rotation than the rate of rotation of said fast chopper.

3. In a radiometer for receiving infrared radiation from an unknown radiation source, means responsive to radiation received by said radiometer for indicating the energy level output of said radiation relative to a predetermined reference level, a calibrating radiation reference source for directing radiation therefrom into said radiometer simultaneously with radiation from said unknown radiation source, means connected to said radiometer responsive means for developing shaped radiation pulses responsive to uniform intermittent reception of radiant energy from said unknown radiation source and from said calibrating radiation source, and means for interruption radiation from said calibrating radiation source at predetermined periods during the reception of radiation from said unknown radiation source.

4. Apparatus as claimed in claim 3 in which the means for interrupting radiation from said calibrating radiation reference source is a rotary chopper having a wide opaque area and a narrow transparent field operable in the path of said calibrating radiation to the radiometer, and means for rotating said chopper at a uniform relatively slow rate of rotation.

5. Apparatus as set forth in claim 4 including a second rotary chopper having a plurality of alternate opaque and transparent sectors disposed in the path of radiation to said radiometer from said unknown radiation source and from said calibrating reference source for intermittently interrupting radiation from both of said sources, and means for rotating said rotary chopper simultaneously with said slow chopper at a materially greater rate of rotation than said slow chopper.

References Cited in the file of this patent

UNITED STATES PATENTS

| | | |
|---|---|---|
| 2,678,581 | Reisner | May 18, 1954 |
| 2,710,559 | Heitmuller | June 14, 1955 |
| 2,870,343 | Golay | Jan. 20, 1959 |